United States Patent
Hsieh et al.

[11] Patent Number: 6,011,558
[45] Date of Patent: Jan. 4, 2000

[54] INTELLIGENT STITCHER FOR PANORAMIC IMAGE-BASED VIRTUAL WORLDS

[75] Inventors: Chun-Wei Hsieh; Tse Cheng; Cheng-Chin Chiang, all of Hsinchu; Shu-Cheng Huang, Tainan, all of Taiwan

[73] Assignee: Industrial Technology Research Institute, Hsinchu, Taiwan

[21] Appl. No.: 08/933,758

[22] Filed: Sep. 23, 1997

[51] Int. Cl.$^7$ .................................................. G06T 11/00
[52] U.S. Cl. ......................... 345/435; 345/421; 382/294
[58] Field of Search ................................... 345/425, 426, 345/430, 421, 435; 382/199, 284, 294

[56] References Cited

U.S. PATENT DOCUMENTS

| | | |
|---|---|---|
| 5,185,667 | 2/1993 | Zimmermann . |
| 5,313,306 | 5/1994 | Kuban et al. . |
| 5,359,363 | 10/1994 | Kuban et al. . |
| 5,384,588 | 1/1995 | Martin . |
| 5,396,583 | 3/1995 | Chen et al. . |
| 5,446,833 | 8/1995 | Miller et al. . |
| 5,561,756 | 10/1996 | Miller et al. . |
| 5,845,007 | 12/1998 | Ohashi et al. ............................ 382/199 |
| 5,848,193 | 12/1998 | Garcia ................................. 382/199 X |

OTHER PUBLICATIONS

Chen, Shenchang Eric, "QuickTime VR—An Image–Based Approach to Virtual Environmental Navigation", Computer Graphics Proceedings, Annual Conference Series, pp. 29–38, 1995.

Szeliski, Richard, "Video Mosaics for Virtual Environments", IEEE Computer Graphics and Applications, pp. 22–30, 1996.

Greene, N., "Environment Mapping and Other Applications of World Projections", IEEE CG&A, pp. 21–29, 1986.

*Primary Examiner*—Mark R. Powell
*Assistant Examiner*—Chanté Harrison
*Attorney, Agent, or Firm*—Fish & Richardson P.C.

[57] ABSTRACT

A pair of images are stitched together by warping the pair of images into an environment map representative of a panoramic image. A first edge and a corresponding second edge for each of the first and second images, respectively, are detected. A set of edge position coordinates along the edge of the first warped image is determined. A set of possible matched solutions from the edge position coordinates of the first and second edge are generated. An optimum matched offset from the set of possible matched solutions is determined. Because the set of possible matched solutions is small and compact, the optimum matched offset can be determined efficiently from the set of solutions.

11 Claims, 4 Drawing Sheets

INTELLIGENT STITCHER FOR PANORAMIC IMAGE-BASED VIRTUAL WORLDS

BACKGROUND OF THE INVENTION

The invention relates to image-based virtual world environments.

Image data is commonly used to represent the real world. Unlike traditional geometry-based systems, there has been increased interest in developing high quality image-based systems for constructing virtual worlds. Image-based systems have the advantage of producing vivid and photo-realistic outputs using personal computers. Another advantage is that the cost of interactively displaying a scene is independent of the scene's complexity. In such systems, a series of images are first acquired by horizontally or vertically rotating a camera about its optical center. Then, the images are warped and stitched together, thereby constructing a panoramic environment map view of the real world.

Panoramic environment maps can be used in different applications such as movie special effects, virtual reality, or games. One problem with constructing such panoramic images relates to the method of stitching together different pieces of a scene to form a larger picture. One solution is to manually establish a relationship between the individual images and solve the unknown parameters of their relative transformations. However, such manual approaches are tedious for large applications.

There are a variety of different forms of environment maps used to render a virtual world. One common approach is to project the input images into a spherical environment map. There are two difficulties in spherical projection systems. One difficulty relates to the lack of a suitable representation for storage on a computer. The other difficulty relates to the placement of the camera. Unless the camera is positioned accurately, significant distortion between partially overlapped images occurs, leading to poor image registration. For these reasons, cylindrical mapping systems are often used to build virtual environment maps.

Referring to FIG. 2, the geometry for a cylindrical mapping system is illustrated. An image plane 10, represented by rectangular area PQRS is projected onto a hypothetical cylinder 12 represented by rectangular area pqrs and having an optical center O. Image plane 10 is tangent to cylinder 12 and has a center O', a focal length f and a radius d of the cylinder. Assume P(x,y) is a pixel in the image plane and p(u,v) is its corresponding pixel in the cylindrical map. From FIG. 2, the coordinates (u,v) can be obtained as follows:

$$u = d \angle O'OB = d\, \tan^{-1}\frac{\overline{O'B}}{\overline{OO'}} = d\tan^{-1}\frac{x}{f}, \quad (1)$$

and $$v = d\frac{\overline{PB}}{\overline{OB}} = d\frac{y}{\sqrt{x^2+f^2}}. \quad (2)$$

Because, in this embodiment, radius d is equal to f, Equations (1) and (2) can be rewritten as follows:

$$u = f\tan^{-1} x/f, \quad (3)$$

and $$v = f\frac{y}{\sqrt{x^2+f^2}}. \quad (4)$$

Using Equations (3) and (4), the input images can be warped and then registered for constructing a complete circular panoramic scene.

SUMMARY OF THE INVENTION

This invention is directed to developing an intelligent stitcher for efficiently aligning a series of images into a complete panoramic scene. An edge-based approach is used for stitching different pieces of images of a scene into a panoramic environment map. Edge information is used to locate, for each edge position of one image, a set of possible matched positions from another image. From the possible matched positions, a full search scheme using a cross-correlation technique is applied. Since the set of possible solutions is relatively small, optimum matched locations can be found very efficiently.

In one aspect of the invention, first and second images are stitched together by warping the images into an environment map representative of a panoramic image. A first edge and a corresponding second edge for each of the first and second images, respectively, are detected. A set of edge position coordinates along the edge of the first warped image is determined. A set of possible matched solutions from the edge position coordinates of the first and second edge are generated. An optimum matched offset from the set of possible matched solutions is determined.

Embodiments of the invention may include one or more of the following features. The environment map is formed of pixels representative of the panoramic image. After the determining step, intensity values of pixels of the first warped image are blended with corresponding pixels of the second warped image.

Detecting a vertical edge one of the images is achieved by determining gradient intensity values along columns of pixels forming one of the images. For each column of pixels, gradient intensity values for all pixels along each column are summed and the summed value is then compared with a preselected threshold value.

Similarly, detecting a horizontal edge of one of the images is achieved by determining gradient intensity values along rows of pixels. For each row of pixels, gradient intensity values for all pixels along each row are summed and the summed value is then compared with a preselected threshold value.

Generating a set of possible matched solutions includes calculating an offset function according to the following equation:

$$d(i,k) = \min_{1 \le j \le N_b} \left| P_a(i) - k - P_b(j) \right|.$$

where:

$P_a$ represents edge position values associated with edge position coordinates of the first warped image;

$P_b$ represents edge position values associated with edge position coordinates of the second warped image;

$N_b$ is the number of edge position values of $P_b$;

k is a user selected variable.

A number $N_p$ representative of the number of edge position values whose value of d (i,k) is less than a threshold value $T_0$ is calculated. An average value of d(i,k) for values of $P_a$ less than a first threshold value $T_0$ is then determined. The position k is determined to be a possible matched solution when the average value of d(i,k) is less than a second threshold value $T_1$ and the number $N_p$ is larger than a third threshold value $T_2$. Determining the optimum matched offset includes applying a mean absolute error correlation technique. Alternatively, a normalized cross-correlation technique can be applied.

In another aspect of the invention, a system for implementing the approach described above is provided. The system includes an edge detector which detects a first edge of the first image and a corresponding second edge for the second image. The edge detector also determines sets of edge position coordinates from each of the first and second edges. The system also includes a memory which stores the sets of edge position coordinates from each of the first and second edges. The system also includes a hypothesis generator and an optimal hypothesis selector. The hypothesis generator generates a set of possible matched solutions from the position coordinates of the detected first and second edges. The optimal hypothesis selector then determines an optimum matched offset from the possible matched solutions.

In preferred embodiments of this aspect, the memory also stores pixels representative of edges of the first and second warped images. The system includes a blending engine for blending intensity values of pixels of the first warped image with corresponding pixels of the second warped image, thereby blending intensity values of the common overlapping areas between the first and second warped images. In this way, intensity discontinuities between matched pixels are smoothed. The edge detector, hypothesis generator, and optimal hypothesis selector may also be embodied within a microprocessor. An external storage may be provided to store the warped images of the environment map.

In general, the invention provides an elegant method for predicting possible solutions for matching pixels along edges of images which are to be stitched together while significantly reducing the search domain. The invention also provides a pruning scheme for predicting the value of cross-correlation. If calculations of cross-correlation are less than a predetermined threshold value, further exploration is not required. Therefore, due to the reduction in calculations involving correlation, the performance of stitching is improved significantly. Compared with conventional algorithms, the proposed scheme offers great improvement in efficiency as well as reliability for the stitching problem. Because the set of possible matched solutions is small and compact, the optimum matched offset can be determined efficiently from the set of solutions.

The proposed approach can be applied into various applications including virtual reality (VR), tour guiding systems, geography information systems, movie special effects, or games.

Other features and advantages will become apparent from the following description, and from the claims.

DESCRIPTION

Figure 1:
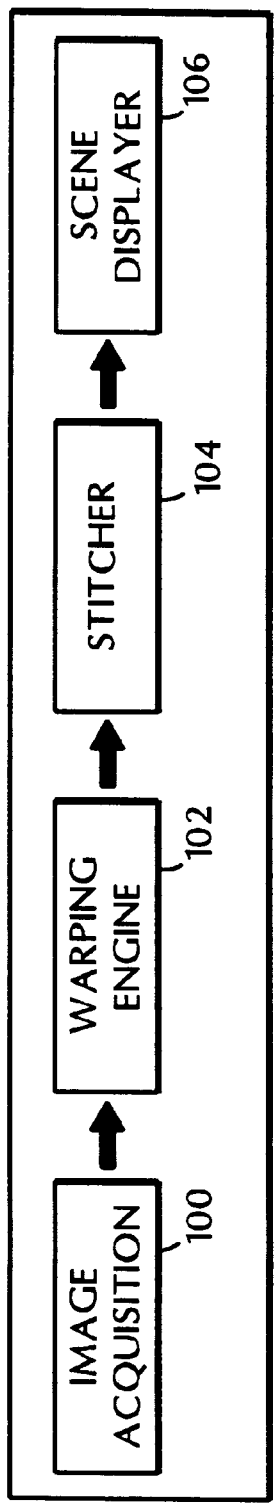
FIG. 1 is a block diagram of a conventional system for generating a virtual panoramic world.
Figure 3:
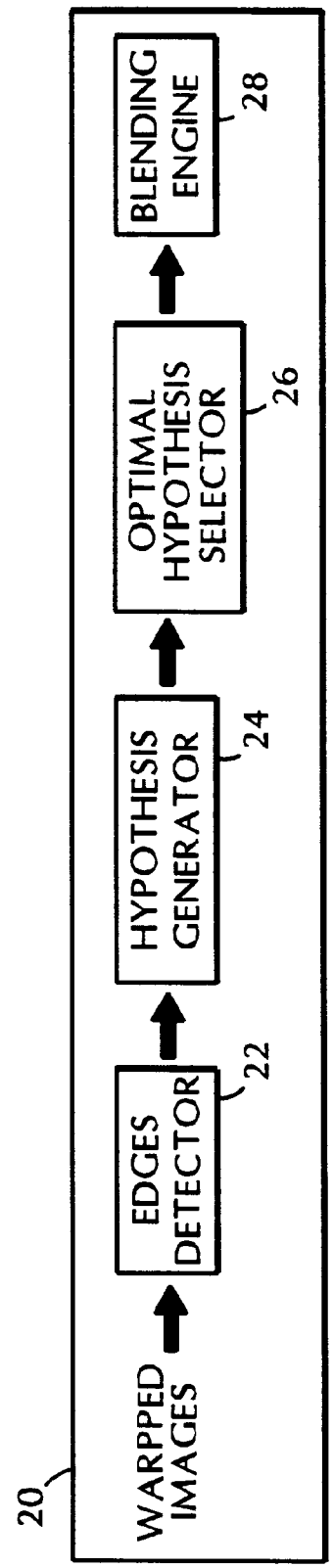
FIG. 3 is a block diagram of a system used to implement the method of the present invention.
Figure 2:
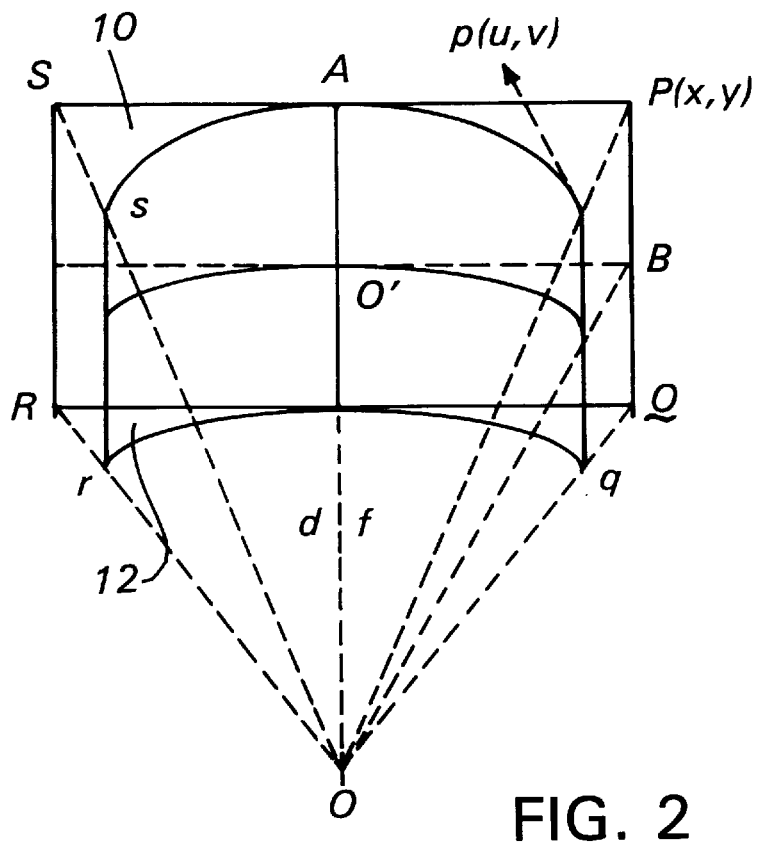
FIG. 2 illustrates the geometry of a cylindrical environment map.

Referring to FIG. 3, an intelligent stitcher system 20 for determining optimum matched locations from edge information is shown. An edge detector 22 is first used to obtain information relating to the edges of images requiring stitching. From the edge information, a hypothesis generator 24 generates a set of possible matched positions. The possible matched positions are verified and the best matched position is selected using an optimal hypothesis selector 26. Finally, when the individual images are aligned into one, a blending engine 28 is applied to smooth the intensity discontinuities between images.

Edge detector 22 uses only the vertical and horizontal edges to predict possible offsets between pixels of adjacent images which are to be aligned. Let $g_x(p)$ denote the gradient of a pixel in the x direction, i.e., $g_x(p(i,j))=|I(p(i+1,j))-I(p(i-1,j))|$, where I(p) is the intensity of a pixel p. If vertical edges are detected, edge detector 22 will accumulate all the values of $g_x(p)$ for all pixels along a column. If the sum of $g_x(p)$ is larger than a preselected threshold, a mark is set to denote the existence of a vertical edge in this column. After examining all columns, a set of vertical edges can be detected. The same approach is also applied to pixels along rows to detect the positions of horizontal edges.

Figures 4A, 4B:
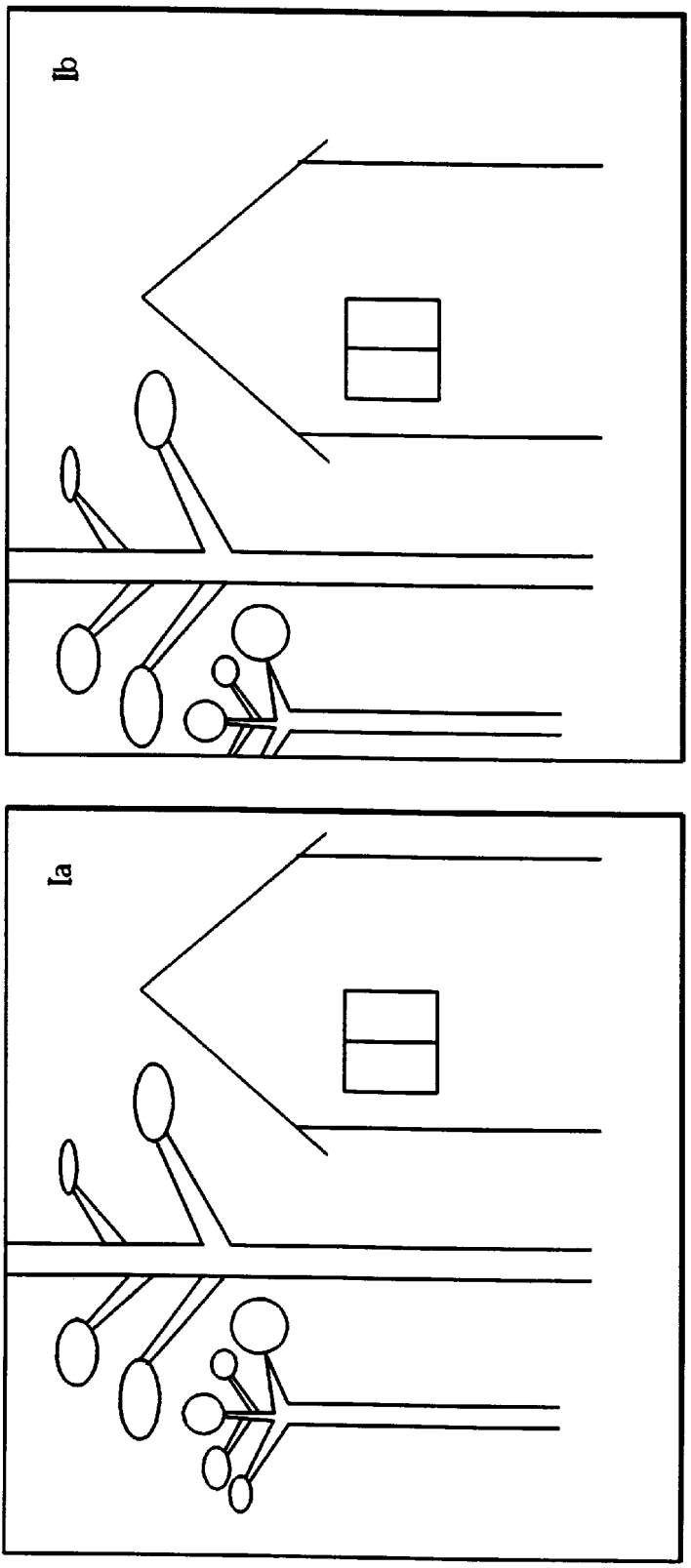
FIGS. 4A and 4B represent images to be stitched together using the system of FIG. 3.

Referring to FIGS. 4A and 4B, a pair of respective images $I_a$ and $I_b$ to be stitched together are shown. Using edge detector 22, the positions of vertical edges in $I_a$ and $I_b$ can be obtained, respectively. For example, the positions of vertical edges in $I_a$ can be obtained as follows: (100, y), (115, y), (180, y), (200, y), (310, y), (325, y), (360, y), (390, y), and (470, y). In addition, the positions of vertical edges in $I_b$ are obtained as follows: (20, y), (35, y), (100, y), (120, y), (230, y), (310, y), and (390, y). From the above edge positions, two sets of vertical edge positions in the x direction are obtained as follows: $P_a$=(100, 115, 180, 200, 310, 325, 360, 390, 470) and $P_b$=(20, 35, 100, 120, 230, 245, 280, 310, 390). There should exist an offset $d_x$ such that $P_a(i)=P_b(j)+d_x$ and the corresponding relation between i and j is one-to-one. Clearly, the offset $d_x$ is the solution of the matched location in the x direction, i.e., $d_x$=-80. However, in some cases, due to the presence of noise, certain edges in $I_a$ and $I_b$ will be lost or undetected. Thus, the relationship between $P_a$ and $P_b$ is no longer one-to-one. Therefore, hypothesis generator 24 is used to generate possible solutions in the x-direction from the edge information.

Let $N_a$ and $N_b$ be the numbers of the elements in $P_a$ and $P_b$, respectively, and $$d(i, k) = \min_{1 \leq j \leq N_b} |P_a(i) - k - P_b(j)|.$$

Given a number k, hypothesis generator 24 will calculate the number $N_p$ of elements in $P_a$ whose d(i,k) is less than a threshold $T_0$. Hypothesis generator 24 averages the values of d(i,k) for the elements in $P_a$ whose d(i,k) are less than $T_0$. If the average value is less than a second threshold $T_1$ and $N_p$ is larger than a third threshold $T_2$, the position k is then considered as a possible matched location in the x direction. By providing different values of k, a set $S_x$ of possible matched solutions can be generated using hypothesis generator 24. Threshold values $T_0$, $T_1$ and $T_2$ are determined empirically and may be, for example, in a range between 1 and 10. The values are pre-established and are transparent to the user.

The same methodology can be applied to horizontal edges for obtaining the set $S_y$ of possible solutions of the matched location in the y direction. Since the number of elements in the union of $S_x$ and $S_y$ is small, the best solution can be obtained very efficiently with optimal hypothesis selector 26.

Optimal hypothesis selector 26 is used to determine the best solution from a set of possible solutions $S \{(x,y) | x \in S_x, y \in S_y\}$. A correlation technique is used to determine the optimum matched set of edge position coordinates. There are two common measures used in the technique, i.e., the mean absolute error (MAE) and the normalized cross-correlation as described in L. G. Brown, supra, which is incorporated herein by reference. Those two common measures are defined, respectively, as:

$$D(p; q) = \frac{1}{(2M+1)^2} \sum_{x,y=-M}^{x,y=M} |I_1(x+p_x, y+p_y) - I_2(x+q_x, y+q_y)|, \quad (5)$$

and $$C(p; q) = \frac{1}{\sigma_1 \sigma_2 (2M+1)^2} \sum_{x,y=-M}^{x,y=M} \quad (6)$$

$$[I_1(x+p_x, y+p_y) - u_1][I_2(x+q_x, y+q_y) - u_2],$$

where $u_i$ and $\sigma_i$ are the local mean and variance of image $I_i$, respectively; and $(2M+1)^2$ represents the area of matching window. Although both methods are suitable for determining an optimal solution where efficiency is not of importance, the normalized cross-correlation technique is preferable because it is more tolerant of variations in image intensities than the mean absolute error technique. However, where efficiency is important, the mean absolute error technique is preferable.

Basically, the computation of mean absolute error is a time-consuming task. Therefore, in this invention, a method similar to a pruning technique is adopted to speed up the computation of the MAE. First, a matrix is obtained by recording all of the temporary values when accumulating the previous result of MAE. The matrix is then used in an increasing threshold sequence to check current accumulated errors. If the current result is larger than its corresponding threshold stored in this matrix, the calculation process is terminated. Because so many calculations involving correlation are skipped, the efficiency of matching is significantly improved.

Blending engine 28 is applied to smooth discontinuities of intensity between overlapping areas of $I_a$ and $I_b$. In this invention, a simple ray-casting method is used.

Figure 5:
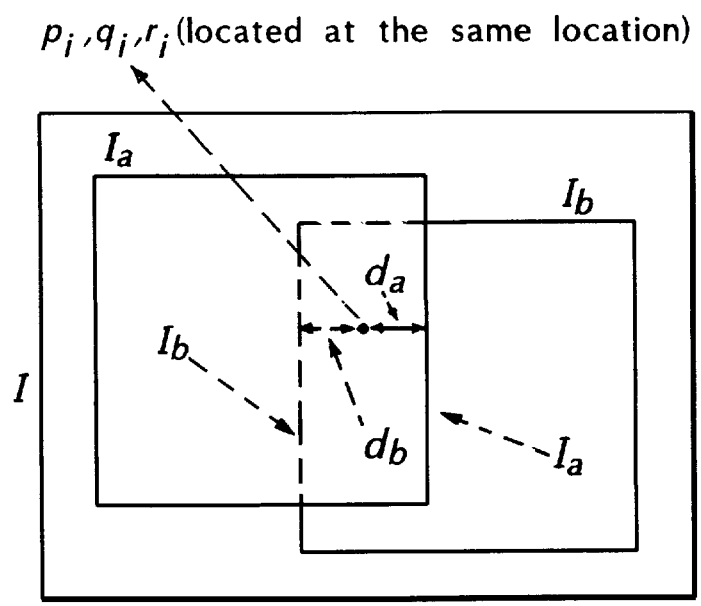
FIG. 5 illustrates the technique for blending intensity values of a pair of matched pixels.

Referring to FIG. 5, let $p_i$ be a pixel in $I_a$ and $q_i$ its corresponding pixel in $I_b$. $l_a$ and $l_b$ represent two boundary lines in $I_a$ and $I_b$, respectively. With $p_i$ and $q_i$, the intensity of the corresponding pixel $r_i$ in the composite image I can be obtained as follows:

$$I(r_i) = \frac{d_a^t I_a(p_i) + d_b^t I_b(q_i)}{d_a^t + d_b^t}, \quad (7)$$

where $d_a$ is the distance between $p_i$ and $l_a$, $d_b$ the distance between $q_i$ and $l_b$, and t an adjustable parameter. With Equation (7), the final composite image I can be obtained.

Figure 6:
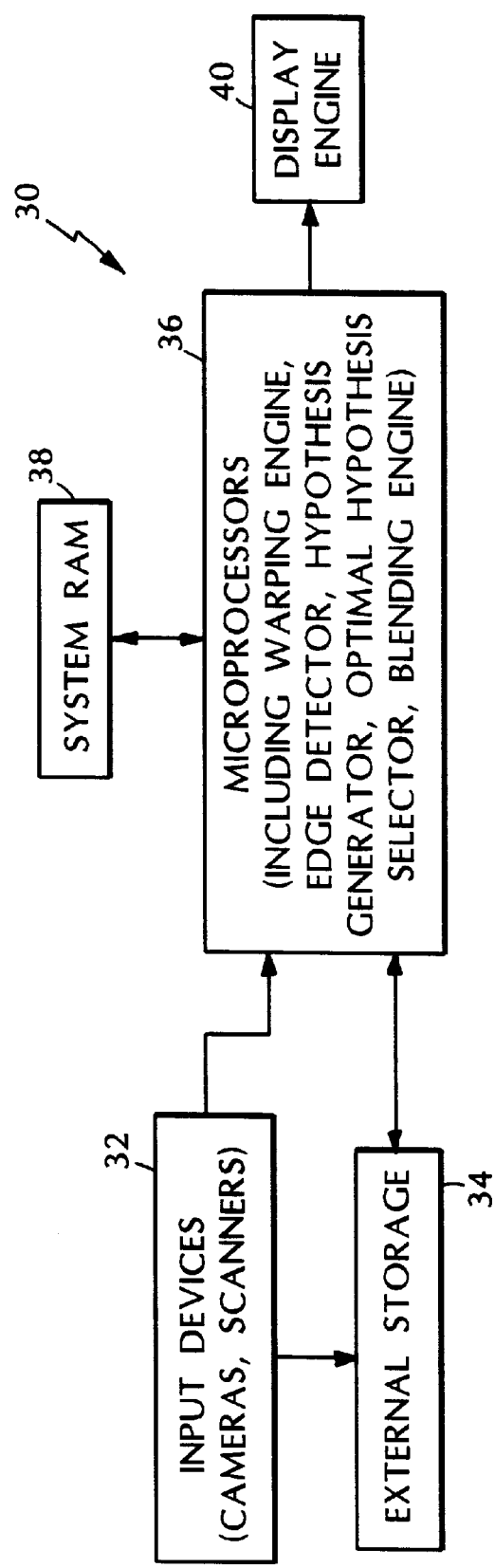
FIG. 6 shows a computer system architecture of the system of FIG. 3.

Referring to FIG. 6 an architecture for implementing a real-time stitcher apparatus 30 is shown. Input devices 32, including users digital cameras or scanners are used to acquire a series of panoramic images. Then, the panoramic images are stored into an external storage 34 such as a hard disk for further processing or directly inputted to microprocessors for stitching. One or more microprocessors 36 are used to perform all of the stitching work including warping, edge detection, hypothesis generation, etc. Temporary data is stored in a system RAM 38 for speeding up the speed of stitching. Once the work of stitching is achieved, the final result is displayed at a display engine 40. This architecture may be built with a general personal computer.

Other embodiments are within the scope of the claims.

What is claimed is:

1. A method of stitching together a first and second image, the method comprising:

warping the first and second images into an environment map representative of a panoramic image;

detecting a first edge for the first warped image and a corresponding second edge of the second warped image;

determining a set of edge position coordinates from each of the detected first and second edges;

generating a set of possible matched solutions from the edge position coordinates of the detected first and second edges; and determining an optimum matched offset of the first image relative to the second image from the set of possible matched solutions.

2. A method of stitching together a first and second image, the method comprising:

warping the first and second images into an environment map representative of a panoramic image, the environment map being formed of a plurality of pixels representative of the panoramic image;

detecting a first edge for the first warped image and a corresponding second edge of the second warped image;

determining a set of edge position coordinates from each of the detected first and second edges;

generating a set of possible matched solutions from the edge position coordinates of the detected first and second edges;

determining an optimum matched offset of the first image relative to the second image from the set of possible matched solutions; and blending intensity values of pixels of the first warped image with corresponding pixels of the second warped image.

3. The method of claim 1 wherein detecting the first and second edges for each of the first and second warped images comprises:

detecting a vertical edge of one of the first and second images including:

determining gradient intensity values along columns of pixels forming one of the first and second warped images;

summing, for each column of pixels, gradient intensity values for all pixels along each column; and comparing the summed value with a preselected threshold value.

4. The method of claim 1 wherein detecting the first and second edges for each of the first and second images comprises:

detecting a horizontal edge of one of the first and second images including:

determining gradient intensity values along rows of pixels forming one of the first and second images;

summing, for each row of pixels, gradient intensity values for all pixels along each row; and comparing the summed value with a preselected threshold value.

5. A method of stitching together a first and second image, the method comprising:

warping the first and second images into an environment map representative of a panoramic image;

detecting a first edge for the first warped image and a corresponding second edge of the second warped image;

determining a set of edge position coordinates from each of the detected first and second edges;

generating a set of possible matched solutions from the edge position coordinates of the detected first and second edges, wherein generating a set of possible matched solutions includes:

calculating an offset function according to the following equation: $d(i,k) = \min |P_a(i) - k - P_b(j)|$.

$1 \leq j \leq N_b$ where:

$P_a$ represents edge position values associated with edge position coordinates of the first warped image;

$P_b$ represents edge position values associated with edge position coordinates of the second warped image;

$N_b$ is the number edge position values of Pb;

k is a user selected variable;

calculating a number $N_p$ representative of the number of edge position values whose value of d(i,k) is less than a threshold value $T_0$;

determining an average value of d(i,k) for values of $P_a$ less than threshold value $T_0$;

determining an average value of d(i,k) for elements of $P_a$ whose d(i,k) is less than a first threshold value $T_0$; and determining that a position k is a possible matched solution when the average value of d(i,k) is less than a second threshold value $T_1$ and the number $N_p$ is larger than a third threshold value $T_2$; and determining an optimum matched offset from the set of possible matched solutions.

6. The method of claim 1 wherein determining the optimum matched offset includes applying a mean absolute error correlation technique.

7. The method of claim 1 wherein the determining the optimum matched offset includes applying a normalized cross-correlation technique.

8. A system for stitching together a first and a second image of an environment map formed of a plurality of pixels representative of a panoramic image, the system comprising:

an edge detector which detects a first edge of the first image and a corresponding second edge of the second image, the edge detector determining sets of edge position coordinates from each of the detected first and second edges;

a memory which stores the sets of edge position coordinates from each of the detected first and second edges;

a hypothesis generator which generates a set of possible matched solutions from the edge position coordinates of the detected first and second edges; and an optimal hypothesis selector which determines an optimum matched offset of the first image relative to the second image from the set of possible matched solutions.

9. The system of claim 8 wherein the memory stores pixels representative of edges of the first and second warped images and the system further comprises a blending engine for blending intensity values of pixels of the first warped image with corresponding pixels of the second warped image.

10. The system of claim 8 wherein a microprocessor includes the edge detector, the hypothesis generator, and the optimal hypothesis selector.

11. The system of claim 8 further comprising an external storage which stores the warped images of the environment map.

* * * * *